United States Patent
Cole et al.

(10) Patent No.: US 6,671,748 B1
(45) Date of Patent: Dec. 30, 2003

(54) METHOD AND APPARATUS FOR PASSING DEVICE CONFIGURATION INFORMATION TO A SHARED CONTROLLER

(75) Inventors: Terry Lynn Cole, Austin, TX (US); Dale E. Gulick, Austin, TX (US); Timothy C. Maleck, Austin, TX (US); Frank Barth, Radebeul (DE); Joerg Winkler, Ullersdorf (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 349 days.

(21) Appl. No.: 09/904,374

(22) Filed: Jul. 11, 2001

(51) Int. Cl.$^7$ ............................................. G06F 13/00
(52) U.S. Cl. ................... 710/8; 710/104; 713/1
(58) Field of Search .................... 710/8–11, 16–17, 710/25, 104, 117, 124; 713/1

(56) References Cited

U.S. PATENT DOCUMENTS

| | | | | |
|---|---|---|---|---|
| 5,202,883 A | * | 4/1993 | Hatherill et al. ............ 370/362 |
| 5,317,693 A | * | 5/1994 | Cuenod et al. ................ 710/9 |
| 5,598,542 A | * | 1/1997 | Leung ........................ 710/117 |
| 5,781,798 A | * | 7/1998 | Beatty et al. ................. 710/10 |
| 5,787,306 A | * | 7/1998 | Michael ........................... 710/9 |
| 5,890,014 A | * | 3/1999 | Long ............................... 710/8 |
| 5,974,474 A | * | 10/1999 | Furner et al. ................... 710/8 |
| 5,987,533 A | * | 11/1999 | Hong .............................. 710/9 |
| 6,012,103 A | * | 1/2000 | Sartore et al. ................. 710/8 |
| 6,049,870 A | * | 4/2000 | Greaves .......................... 713/1 |
| 6,243,773 B1 | * | 6/2001 | Mahalingam ................ 710/302 |
| 6,598,095 B2 | * | 7/2003 | Peterson ......................... 710/8 |

* cited by examiner

Primary Examiner—Christopher B. Shin
(74) Attorney, Agent, or Firm—Meyertons Hood Kivlin Kowert & Goetzel, P.C.; B. Noël Kivlin

(57) ABSTRACT

A method and apparatus for passing device configuration information to a shared controller. In one embodiment, a host controller may be configured to read configuration from one or more peripheral devices coupled to a serial bus. The peripheral devices may include coder/decoder (codec) circuitry, and may be implemented using a riser card. The host controller may employ one or more of several different techniques in order to read configuration information from the peripheral device. The configuration information at a minimum includes a device identifier, which may identify the vendor and the function of the device. Additional information needed to configure the device to communicate over the peripheral bus may also be obtained with a read of the device, or various lookup mechanisms, such as a lookup table or a tree-like data structure. After configuration information has been obtained for each device coupled to the bus, the host controller may dynamically configure each of the devices for communication over the bus, thereby allowing the flexibility to enumerate riser cards and add new functions through peripheral devices to the computer system in which the bus is implemented.

25 Claims, 7 Drawing Sheets

120 ↘

| Device Type and Vendor | Parameter A | Parameter B | Parameter C | Parameter D | Parameter E | Parameter F | Parameter G | |
|---|---|---|---|---|---|---|---|---|
| Vendor A Modem | | | | | | | | |
| Vendor B Modem | | | | | | | | |
| Vendor A CD-ROM | | | | | | | | |
| Vendor D N.I.C. | | | | | | | | |
| Vendor E Scanner | | | | | | | | |
| Vendor E DVD | | | | | | | | |
| Vendor E CD R/W | | | | | | | | |

*Fig. 6*

METHOD AND APPARATUS FOR PASSING DEVICE CONFIGURATION INFORMATION TO A SHARED CONTROLLER

BACKGROUND OF THE INVENTION

1. Field of the Invention

This invention relates to computer systems, and more particularly, to the identification and configuration of peripheral devices coupled to a peripheral interconnect bus.

2. Description of the Related Art

As the complexity of computer technologies grows and more, improved features are available to users of personal computers, demand for these features increases. PC (personal computer) users also demand that these features be made available at a low cost. These pressures force PC designs to use higher levels of integration throughout the system. The need for a higher level of integration may lead to the development of new types of peripheral buses and I/O (input/output) concepts.

One of the subsystems which has been targeted for increased integration is the audio/modem subsystem. Integration of the audio/modem subsystem into the motherboard by physically soldering components of the subsystem to the motherboard has been problematic because of delays resulting from certification of the modem. These problems have, in part, been addressed by development of various new specifications, including the Audio Codec '97 (AC '97) and the Audio/Modem Riser (AMR) Specification developed by Intel. The AMR Specification, which in some embodiments may be partly based on the AC '97 specification, defines a hardware-scalable original equipment manufacturer (OEM) motherboard riser board and interface that supports both audio and modem functions. By physically partitioning the portion of the modem that must be certified (analog I/O) on a riser module which is separate from the motherboard, certification processes do not delay the development of the remainder of the motherboard.

Referring to FIG. 1, a typical physical configuration of an AMR card on a motherboard is illustrated. In this system, riser card 11 is plugged into an expansion slot 12 of motherboard 13. The audio/modem subsystem includes controller 14 which is mounted directly to motherboard 13, as well as codec 15 which is mounted to riser card 11. Because riser card 11 can be removed from expansion slot 12 and thereby disconnected from motherboard 13, riser card 11 can be certified without regard to motherboard 13.

While riser card 11 can be physically decoupled from motherboard 13, riser card 11 is provided and installed by the original equipment manufacturer. It is contemplated by the AMR Specification that the configuration of the audio/modem subsystem will be known and its design taken into account in the design and configuration of the motherboard, including configuration of the BIOS software. Often, however, this is not the case.

In developing the AMR Specification, it was theorized that, because end users would not change or install audio/modem riser cards themselves, there would be no need for the riser cards to be enumerated. ("Enumeration" refers to the process of identifying buses and devices coupled to the buses so that plug and play software can allocate the appropriate resources for the devices, install the appropriate drivers, etc. This process is employed, for example, to identify devices connected to PCI buses.) Consequently, it was expected that the audio/modem riser devices would be known at the time the BIOS was installed, and the BIOS could be programmed for the devices. The AMR Specification therefore provided no mechanism for identifying these devices.

While the riser cards are not typically changed or installed by end users, they are often installed at the last stage of the PC building process. Consequently, the BIOS code may have already been installed by the time the riser card is plugged into the motherboard and may not be programmed for the particular riser card that is installed. Since the riser card installation may be performed as part of a configuration-to-order process at a distribution depot, it is likely that the riser card which is actually installed is not the same one which is expected by the BIOS code.

Furthermore, due to the theory behind the AMR specification, peripheral buses based on this specification may lack flexibility. Plug and play devices may be difficult, if not impossible to support. Configuring a bus based on this specification must follow design rules that are already defined in the specification. Timeslots or data streams may be pre-assigned, and the system may lack the flexibility to change them. Thus, peripheral devices having new features and functionality may be prevented from being implemented on this bus, or may only operate with reduced functionality. The bus may be unable to respond adaptively to various devices coupled to it.

SUMMARY OF THE INVENTION

The problems outlined above may in large part be solved by a method and apparatus for passing device configuration information to a shared controller. In one embodiment, a host controller may be configured to read configuration from one or more peripheral devices coupled to a serial bus. The peripheral devices may include coder/decoder (codec) circuitry, and may be implemented using a riser card. The host controller may employ one or more of several different techniques in order to read configuration information from the peripheral device. The configuration information at a minimum includes a device identifier, which may identify the vendor and the function of the device. Additional information needed to configure the device to communicate over the peripheral bus may also be obtained with a read of the device, or various lookup mechanisms, such as a lookup table or a tree-like data structure. After configuration information has been obtained for each device coupled to the bus, the host controller may dynamically configure each of the devices for communication over the bus, thereby allowing the flexibility to enumerate riser cards and add new functions through peripheral devices to the computer system in which the bus is implemented.

In various embodiment, the peripheral bus may be a serial bus, such as a DSL (digital subscriber line) bus or a universal serial bus (USB). Communication across the bus may be performed in frames of data, wherein each frame includes multiple timeslots. In some of these embodiments, a timeslot within the frame may be reserved for control information for each of the devices coupled to the bus. Some devices coupled to the bus may require a certain quantity of timeslots, while other devices may require one or more timeslots having certain positions within each frame. After determining the various needs of each of the devices coupled to the bus, the host controller may then dynamically assign timeslots to each device coupled to the serial bus. Furthermore, the host controller may be configured to detect plug and play devices. Upon detecting a plug and play device, a host controller may re-assign the timeslots within a frame to each device to ensure that the plug and play device may function without interfering with the functioning of other devices coupled to the bus. In some embodiments, the host controller may also perform a reconfiguration if a device is removed from the bus, thereby allocating additional timeslots to one or more of the remaining devices.

In other embodiments, stream addressing may be used for communication across the bus. A data stream may be considered to be a special form of a timeslot. In embodiments employing stream addressing, the host controller may assign a data stream to each device. The data stream may include identification information. Each device may monitor the bus for data streams having matching identification value, and may thus read and respond to its assigned data stream when it is detected. The data within a data stream may be formatted in a manner that best suits the device to which the data stream corresponds. In addition to having a data stream dedicated to each device on the bus, an additional data stream, referred to here as a control data stream, may be formatted to convey control data for each device between the host controller and the respective devices. The host controller may assign a plurality of bit positions within the control data stream to each device, and configure the device to respond to its assigned bit positions when the control data stream is conveyed across the bus.

In various embodiments, the type of control information obtained by the host controller may include, but is not limited to, quantity and/or position of timeslots needed, data format required by the device, data width of the device (i.e. 16 bits, 32 bits, etc.), supported device modes, amount of buffer memory available in the codec/peripheral device, addressing modes (i.e. frame/timeslot addressing, stream addressing, etc.), input/output (I/O) space required on higher layer system buses, and clocking information. The reading of configuration information may in some embodiments be facilitated by the use of a serial side bus, which is independent of the actual peripheral bus. The serial side bus may be dedicated to reading configuration information and configuring devices coupled to the peripheral bus. Furthermore, some embodiments may employ a serial EPROM (erasable-programmable read-only memory) to store the configuration information.

Thus, in various embodiments, method and apparatus for passing device configuration information to a shared controller may allow a peripheral bus to be configured following the PC building process. This may allow a personal computer to support a wider range of after-market peripheral devices, and may allow an end user to reconfigure the system as the user's needs change. The ability to dynamically configure the bus may also allow for the use of plug and play devices.

BRIEF DESCRIPTION OF THE DRAWINGS

Other objects and advantages of the invention will become apparent upon reading the following detailed description and upon reference to the accompanying drawings in which:

FIG. 6 is an exemplary illustration of one embodiment of a lookup table which may be used by a host controller to configure a peripheral bus and the various devices which may be coupled to it;

Figure 1:
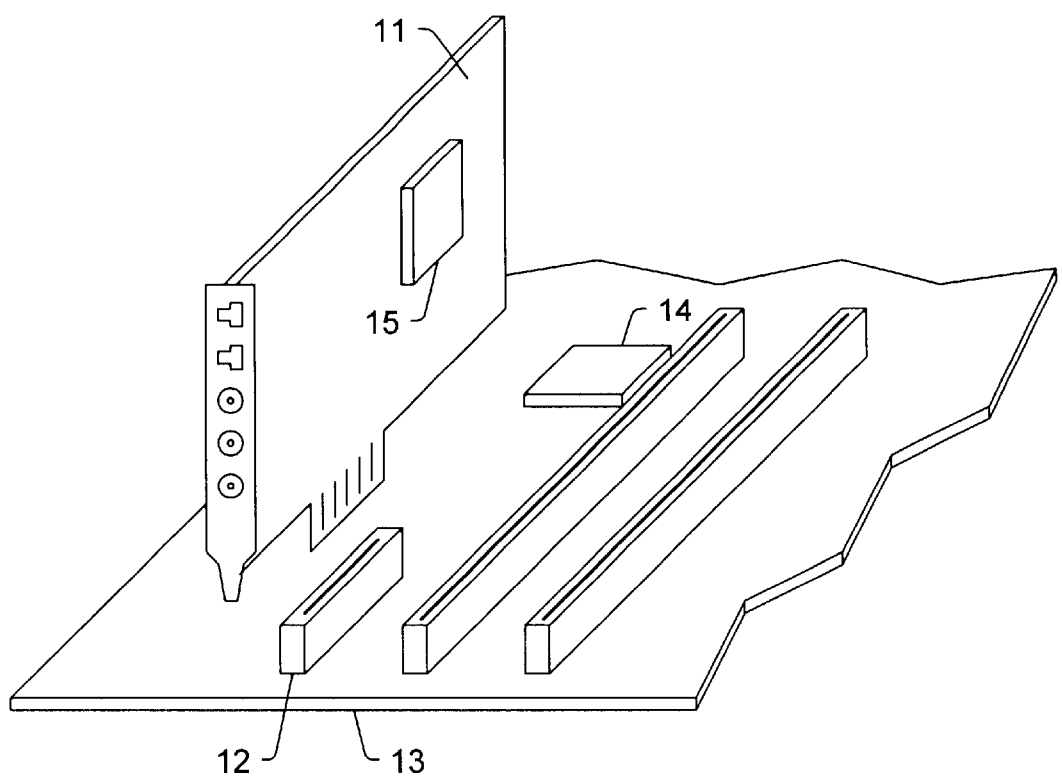
FIG. 1 (prior art) is a drawing illustrating one embodiment of a typical physical configuration of an AMR card on a motherboard.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION OF THE INVENTION

Figure 2:
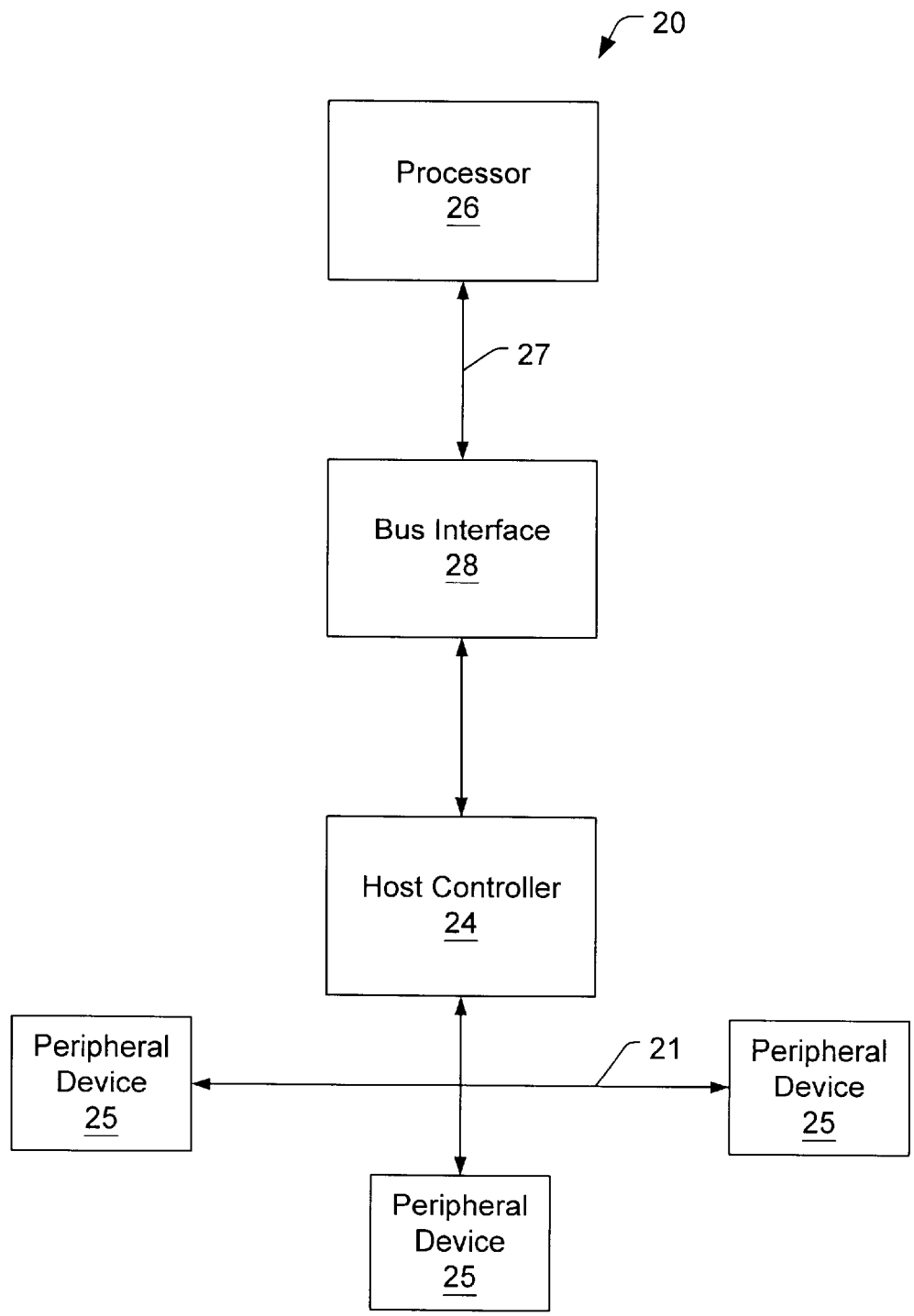
FIG. 2 is a block diagram of one embodiment of a computer system having a host controller and peripherals coupled to a peripheral bus.

Turning now to FIG. 2, a block diagram of one embodiment of a computer system is shown. Computer system 20 includes a processor 26 coupled to bus interface unit 28 via processor bus 27. Other embodiments, including those having multiple processors, are possible and contemplated. Bus interface 25 may be coupled to host controller 24, which may be a host controller for a peripheral bus. In one embodiment, host controller 24 and bus interface 28 may be implemented on the same chip, while other embodiments may implement host controller 24 and bus interface 28 on separate chips. Host controller 24 and bus interface 28 may be coupled by various types of buses, such as a peripheral component interconnect (PCI) bus. Peripheral bus 21 may be a serial bus or a parallel bus. Types of serial buses may include, but are not limited to DSL buses and USB buses. Serial buses may also be based on the AC '97 specification discussed above. Host controller 24 may be coupled to one or more peripheral devices 25 through peripheral bus 21. In the embodiment shown, three peripheral devices are shown coupled to the host controller, although generally speaking, there is no specific upper or lower limit to the number of peripherals that may be coupled to host controller 24.

Host controller 24 may be used to control communications between each of peripheral devices 25 and bus interface 28. Bus interface 28 may control communications between host controller 24 and processor 26. Thus, processor 26 may be able to communicate with each of peripheral devices 25 through bus interface 28 and host controller 24. Host controller 24 may be configured to report status information for each of peripheral devices 25 to processor 26 via bus interface 28.

Figure 3:
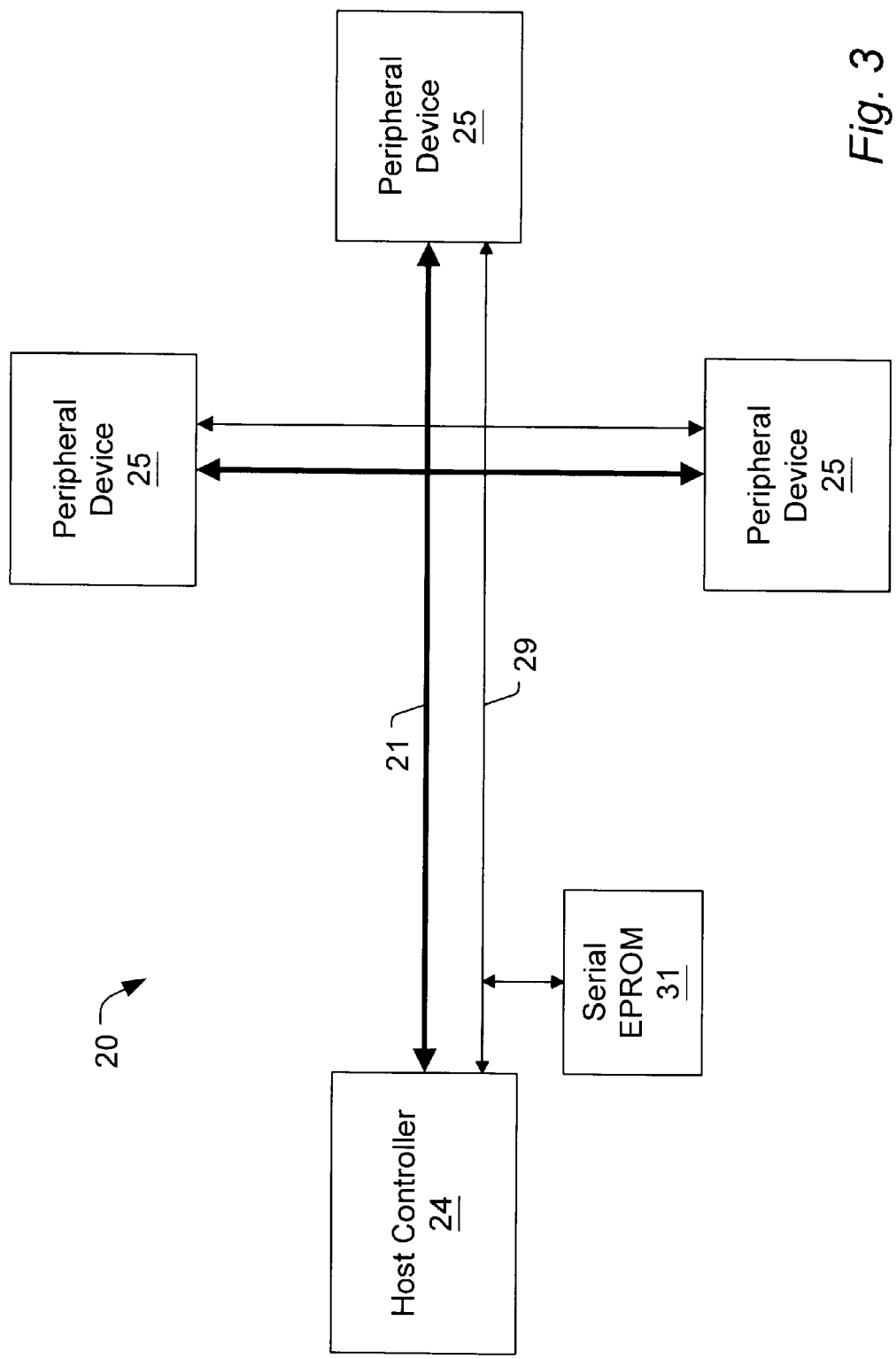
FIG. 3 is a block diagram of one embodiment of a computer system having a host controller with multiple peripherals coupled to it through a peripheral bus, and further includes a serial side bus for transferring configuration information.

Moving now to FIG. 3, a block diagram of one embodiment of a computer system having a host controller with multiple peripherals coupled to it through a peripheral bus, and further includes a serial side bus for transferring configuration information. In the embodiment shown, computer system 20 includes a plurality of peripheral devices 25 which are coupled to host controller 24 through peripheral bus 21. Peripheral devices 25 may also be coupled to host controller 24 through serial side bus 29. Serial side bus 29 may include serial EPROM 31 arranged on the bus between peripheral devices 25 and host controller 24. Serial EPROM 31 may be used to store configuration data. In some embodiments, an EPROM (serial or parallel) may be located within host controller 24. Embodiments utilizing other means of storing configuration data, such as random access memory (RAM), flash memory, registers, and so on, are possible and contemplated.

Serial side bus 29 may be implemented in order for host controller 24 to read configuration information from each of peripheral devices 25. Configuration information may include identification information for each peripheral device 25, which may indicate the function of the device and its vendor. Additional information may be read by host controller 24 from each of peripheral devices 25, or may be obtained through various structures such as a lookup table or a tree-like structure (as will be discussed in further detail below). When reading information, host controller 24 may obtain information through a single serial read to each device in one particular embodiment. In another embodiment, host controller 24 may be configured to obtain information from each of peripheral devices 25 through successive reads to each device, with each read obtaining a portion of the configuration information.

Device information read by host controller 24 (or obtained by other means) may be used to configure each of the peripheral devices coupled to the bus and/or the host controller. In some embodiments wherein the peripheral bus is a serial timeslot bus, host controller 24 may obtain information from each peripheral device 25 concerning the assignment of timeslots. Some devices may need a specific quantity of timeslots for communications with the host controller, while other devices may need to be assigned a timeslot in a specific position of a frame (e.g. timeslot 1, timeslot 2, etc.), while some devices may need timeslots in a specific quantity and a specific position. Some embodiments, rather than using timeslots, may conduct communications between host controller 24 and peripheral devices 25 using stream addresses. In such embodiments, host controller 24 may assign a first data stream to a first peripheral device 25, a second data stream to a second peripheral device 25, and so on. Each peripheral device 25 may then monitor peripheral bus 21 for the presence of its assigned data stream. A separate data stream may also be assigned to convey control information between host controller 24 and each of peripheral devices 25. Stream addressing will be discussed in further detail below. Regardless of the type of bus, host controller 24 may determine the data format(s) the may be required for communications with each of peripheral devices 25.

Each peripheral device 25 may have a data width (e.g. 16 bits, 32 bits, etc.) which may be included in the configuration information obtained by host controller 24. This may be true regardless of whether peripheral bus 21 is a serial bus or a parallel bus. In the case of serial buses, host controller 24 and peripheral devices 25 may each include circuitry for serial-to-parallel and parallel-to-serial conversion.

Host controller 24 may also be configured to determine the various modes in which each of peripheral devices 25 may operate. For example, a peripheral device 25 may be a modem, and may be able to operate using various modem protocols, such as V.90 or V.34. The modem may also be configured to operate at various baud rates. This information. Thus, host controller 24 may be configured to determine each protocol and baud rate at which the modem may operate. Similar examples may apply to other peripheral devices that may be coupled to peripheral bus 21. Such peripheral devices may include, but are not limited to CD-ROM players and CD-ROM recorders, DVD-ROM players, network interface cards, sound/audio cards, graphics cards, scanners, printers and printer interfaces, and so forth.

Each of peripheral devices 25 may include a certain amount of buffer memory, and may further require I/O address space on higher layer peripheral buses. Host controller 24 may be configured to read or determine the amount of buffer memory available in each peripheral device 25, as well as the amount of I/O address space required. In addition to reading or determining the amount of buffer memory available in each peripheral device 25, host controller 24 may further obtain addressing information for the buffer memory space, if any, in each of peripheral devices 25. Determining the amount of I/O address space needed on a higher level system bus (e.g. a PCI bus coupling a host controller to a bus interface) may be necessary in order to facilitate communications between a processor and the respective peripheral device.

Some peripheral devices may include an internal clock, and thus host controller 24 may be configured to determine whether the clocks of such devices may be used as a master clock or as a slave clock. If the internal clock of a peripheral device is used as a master clock, it may be able to synchronize data transfers across the peripheral bus.

Various other types of information may also be obtained by host controller 24, such as any additional identifying information (such as serialized identifying information or encrypting identifying information). In general, host controller 24 may be configured to obtain and respond to wide variety of information necessary to ensure proper operation of a given peripheral device.

Host controller 24 may further utilize serial side bus 29 in order to convey configuration information to each of peripheral devices 25 coupled to peripheral bus 21. For example, host controller 24 may convey information to each peripheral device 25 concerning their assigned timeslots or stream addresses. Host controller 24 may also utilize serial side bus 29 in order to write configuration information for each device into serial EPROM 31, which may then store the configuration information. Serial EPROM 31 may be accessed by host controller 24 and/or peripheral devices 25 in order to read configuration information if necessary. Host controller 24 may also perform additional writes to serial EPROM 24 if there is a change in the status of one or more devices coupled to the bus.

Computer system 20 may be configured for plug and play devices. Peripheral bus 21 may be configured to allow plug and play compatible devices to be added subsequent to the initial configuring of peripheral bus 21. Host controller 24 may be configured to detect the addition of a plug and play device. Responsive to the detection of an added plug an play device, host controller 24 may reconfigure the bus, as well as each peripheral device 25 already coupled to the bus. For example, host controller 24 may be configured to change the timeslot assignments for one or more devices or stream addressing requirements for one or more devices. Host controller 24 may also reconfigure I/O address space assignments based on the detection of a new device. Host controller 24 may further be able to resolve conflicts between the various peripheral devices 25, such as conflicts between devices concerning timeslot assignments, stream address assignments, interrupt requests, and so on. This may allow host controller to easily reconfigure peripheral bus 21 at any time subsequent to its initial configuration in order to allow a multitude of new devices to operate with computer system 20.

Figure 4:
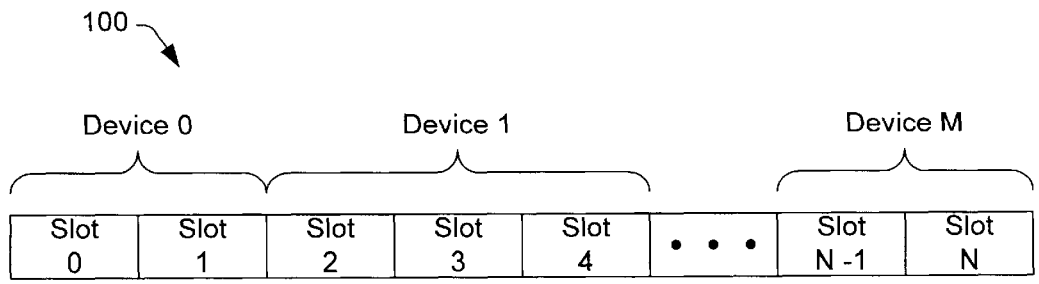
FIG. 4 is an illustration of one embodiment of a frame having multiple timeslots for communication between a host controller and various devices, with each device having dedicated timeslots.

Turning now to FIG. 4, an illustration of one embodiment of a frame having multiple timeslots for communication between a host controller and various devices, with each device having dedicated timeslots is shown. In the example shown, data frame 100 includes M timeslots for N peripheral devices coupled to a peripheral bus, where M and N are both integer values. In this particular example, a device couple to the peripheral bus, device 0, is assigned to slots 0 and slot 1. Device 1 is assigned to slots 2, 3, and 4, while device M is assigned to slots N−1 and N. In some embodiments, one or more slots may be reserved for control information for each of the devices, and may be any slot within frame 100.

Frame 100 may have any number N of timeslots. In various embodiments, the number of timeslots in a given frame may be an integral power of 2 (e.g. 8 timeslots, 16 timeslots, 32 timeslots, etc.). In some embodiments of computer system 20, host controller 24 may be configured to adjust the number of timeslots depending upon the number of devices coupled to the bus. Furthermore, host controller 24 may be configured to assign additional timeslots to each device (i.e. more than the minimum number required) when the number of devices coupled to the bus allows. These methods may allow for more efficient use of bandwidth, either by allowing more frames to be transmitted across the bus, or allowing each device to transmit more information with each frame.

As with the number of timeslots in each frame 100, the number of bits or bit-times in each timeslot may vary. In some embodiments, this number may also be an integral power of 2. In embodiments where the serial bus consists of only a single line for data transmission, each timeslot may be a certain number of bits in length (e.g. 8 bits, 16 bits, 32 bits, etc.). Some buses may have one or more additional data lines, which may result in the more data in each timeslot. For example, a DSL bus may be able to operate in a single-pin mode (one data line) or a dual-pin mode (two data lines). For a DSL bus having timeslots that are 16 bit-times in length, 16 bits of data may be transmitted in each timeslot in single pin mode (16 bit-times by 1 data line) or 32 bits in dual-pin mode (16 bit-times by 2 data lines). Thus, the amount of data transmitted in each timeslot (and thus each frame) may depend partially upon the number of data lines on the peripheral bus. Host controller 24 may be configured to adjust the number of bit-times in each timeslot, similar to the adjusting of the number of timeslots in each frame 100, in order to ensure more efficient use of bandwidth.

In some embodiments, frames 100 may be subdivided into transmit frames (i.e. frames transmitted by the host controller to peripheral devices) and receive frames (i.e. frames received by the host controller from one or more of the peripheral devices).

Figure 5:
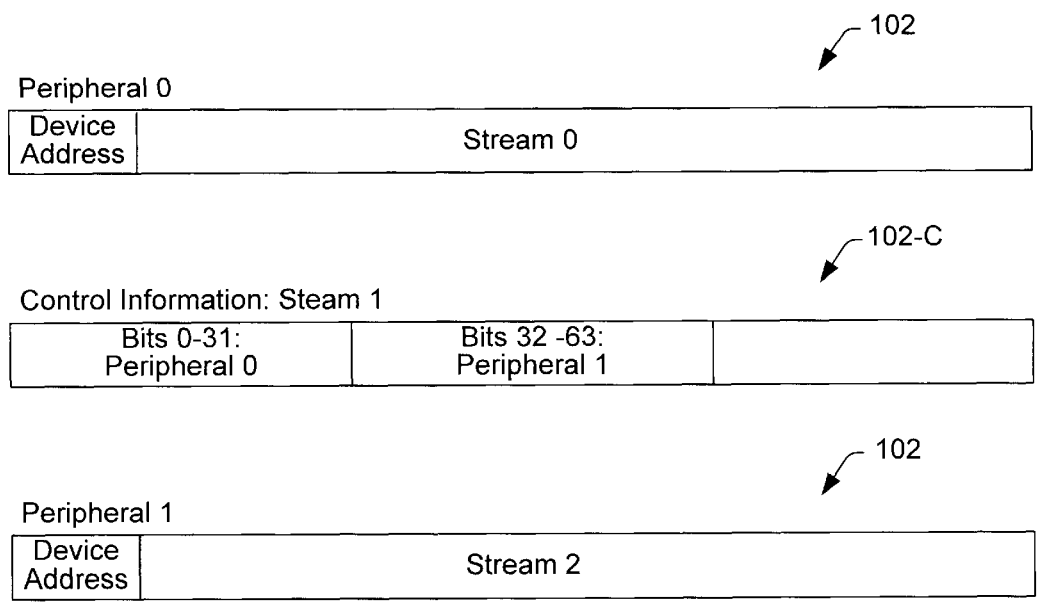
FIG. 5 is an illustration of one embodiment of a communications format using stream addressing for communications between a host controller and a plurality of devices.

Turning now to FIG. 5, an illustration of one embodiment of a communications format using stream addressing for communications between a host controller and a plurality of devices is shown. In the example shown, three data stream 102 are present. Stream 0 is dedicated to peripheral device 0 while stream 2 is dedicated to peripheral 1. A third data stream 102-C, or stream 102-C, may be used for conveying control data. Data streams may be assigned for any number of devices which may be coupled to a peripheral bus.

Both stream 0 and stream 2 each include a device address so that a peripheral device on the bus may be able to identify a stream transmitted to it from a host controller. Similarly, the device address may be used by a host controller to determine which peripheral device transmitted a particular data stream. Various other means may be used to identify the correlation between a particular data stream and a peripheral device in other embodiments.

Within each stream, data may be formatted in any manner suitable for communications between its assigned peripheral device and the host controller. Furthermore, the data formats may vary from one peripheral device to the next in some embodiments. This may allow the host controller to optimize the performance for each of the peripheral devices coupled to the bus.

Stream addressing may offer additional flexibility for optimization of system performance, as some embodiments of the host controller may transmit or receive data streams from in any order with respect to the peripheral devices coupled to the bus. Various embodiments of the host controller may be further configured to dedicate more bandwidth to higher bandwidth devices. For example, if a first device having high bandwidth requirements and a second device having low bandwidth requirements are coupled to a host controller via a peripheral bus, the host controller may conduct several communications transactions with the first device for each single communications transaction with the second device. In general, the host controller may provide and adjust the bandwidth for communications with each peripheral device as necessary.

As previously noted, stream 1 (ref. numeral 102-C) in the example shown may be used to convey control information for each of the peripheral devices to and from the host controller. In the example shown, bits 0–31 are assigned to peripheral 0 while bits 32–63 are assigned to peripheral 1. In various embodiments, a greater or lesser number of bits may be assigned for control information for each peripheral, and some peripherals may be assigned a greater number of bits than others. It should also be noted that the information may be assigned as bit-times (e.g. the DSL bus as described above). In general, stream 1 may be used for control information transactions between the host controller and the peripheral devices coupled to a peripheral bus. Control information may include status information, interrupt requests and cause codes, priority requests, data transmission requests, and so on. In one embodiment, control information transactions may be conducted between a host controller and the peripheral devices coupled to the bus on a periodic basis. In another embodiment, control information transactions may be conducted as requested by the host controller and/or one or more of the peripheral devices coupled to the bus.

Moving now to FIG. 6, an exemplary illustration of one embodiment of a lookup table which may be used by a host controller to configure a peripheral bus and the various devices which may be coupled to it is shown. Lookup table 120 is an exemplary lookup table similar to one that may be implemented in a computer system, such as computer system 20 of FIGS. 2 and 3. It should be noted that in various embodiments, lookup table may be significantly larger than that which is shown in this example, and that a wide variety of embodiments of the lookup table are possible and contemplated.

Lookup table 120 includes a first column having identification information for a plurality of peripheral devices. In the embodiment shown, identification information includes a vendor ID and a device type. Additional identification may be included also, and may be necessary in embodiments where an individual vendor manufactures multiple models of a particular peripheral device.

Lookup table 120 also includes a plurality of parameter columns. The parameter columns may comprise configuration information for each of the particular peripheral devices. Information in the parameter columns may include any of the configuration information cited above in reference to FIGS. 2 and 3. Additional information in the parameter column may include parameters or specifications that are specific to the type of device. Examples include, but are not limited to, modem baud rates, data rates of CD-ROMs, data transfer rates for a network interface card (N.I.C.), and so on. Once the host controller has obtained the necessary parameters from lookup table 120, it may store the information in a memory device, such as serial EPROM 31 of FIG. 3.

Using a lookup table such as lookup table 120, a host controller may be able to read device identification information from a peripheral device, and obtain the rest of necessary configuration information from the lookup table. This may eliminate the need for multiple reads of a peripheral device, or lengthy reads from each peripheral device.

Lookup tables may be implemented in various ways. In one embodiment, a lookup table may be stored in read-only memory within a host controller. In another embodiment, a lookup table may be included with operating system software, and may reside in main memory or in storage (e.g. hard disk storage), and may be accessed as necessary by a host controller. Lookup tables may further be configured to be updated by software, such as new revisions of an operating system, or with software included with a peripheral device.

In another embodiment, the lookup table may be implemented by having it wholly or partially stored in a serial device or the peripheral itself. This may be one of the most common methods of implementing the lookup table. By implementing the lookup table in this manner, only those parameters needed must be stored in the serial device or peripheral device. Furthermore, the necessary parameters may be automatically provided to the host controller by simply plugging into the bus the serial/peripheral device or a riser card upon which a peripheral function is implemented.

A wide variety of implementation methods are possible and contemplated for lookup table 120 and its various related embodiments.

Figure 7:
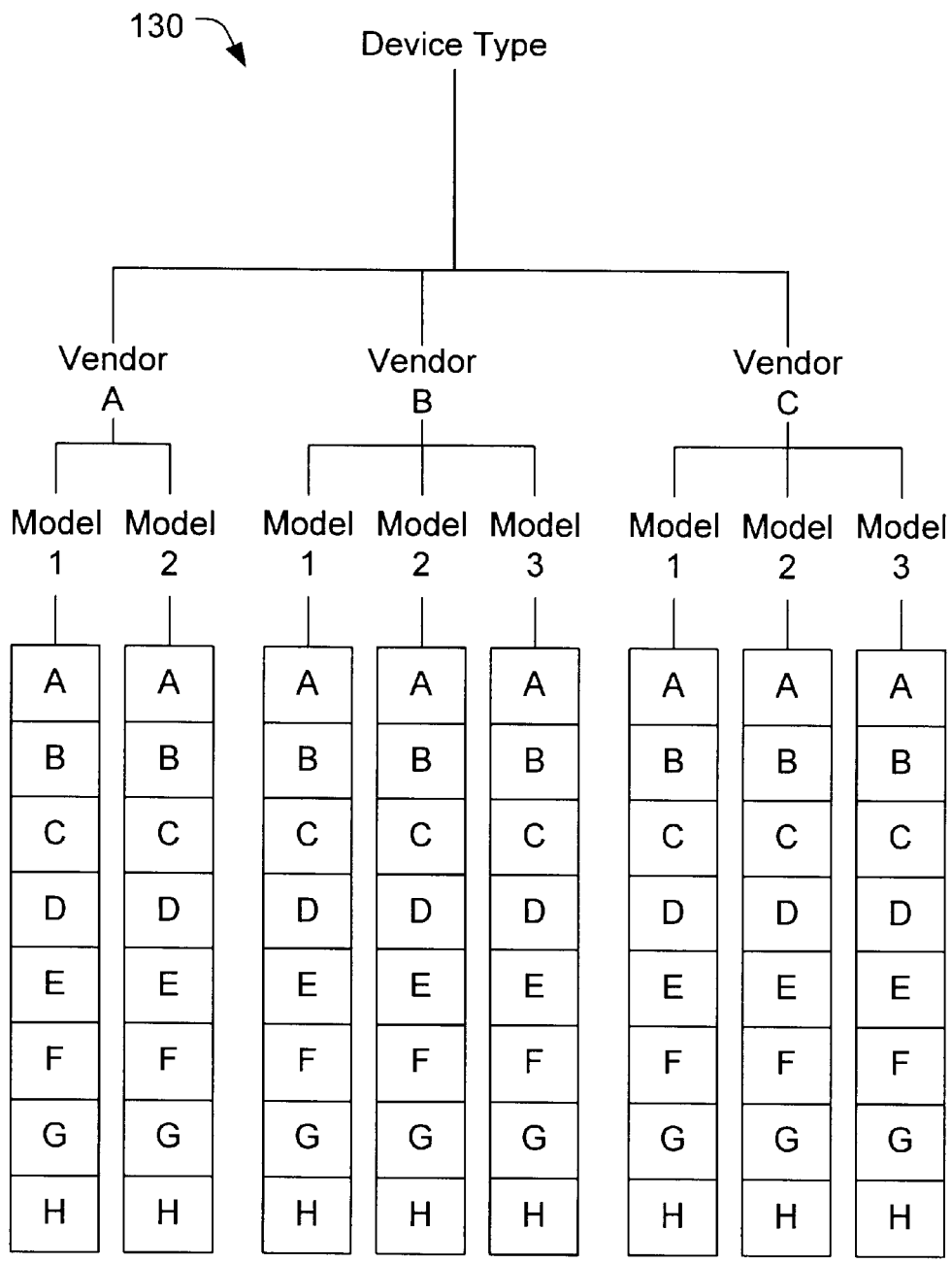
FIG. 7 is an illustration of one embodiment of a lookup-tree structure which may be used by a host controller to configure a peripheral bus and the various devices which may be coupled to it.

Turning now to FIG. 7, an illustration of one embodiment of a lookup-tree structure which may be used by a host controller to configure a peripheral bus and the various devices which may be coupled to it. In the embodiment shown, tree structure 130 represents a tree of possible parameters for one particular device type (e.g. CD-ROM, scanner, etc.). The parameters obtained from the tree structure 130 may comprise configuration information for a peripheral device. Tree structure 130 may be ideally suited for quick parsing by a host controller in order to obtain configuration information. In the example shown, tree structure 130 includes a device type level, a vendor level, a model level, and a parameter level. Multiple parameters may be present in the vendor level as shown, and a greater or lesser number of parameter may be present depending on the device type, vendor, and model. It should also be noted that within the parameters, additional tree structures may be present in situations where the particular peripheral device may operate in multiple modes or with multiple parameters.

For the embodiment shown, a host controller may read the device type and vendor from a peripheral device coupled to a peripheral bus. Following the reading of the device type, the host controller may choose the vendor on the next level down based on the vendor information read from the device. The host controller may then progress to the next level of the tree and choose a model for the specific peripheral device, providing the chosen vendor manufactures multiple models of the same type of peripheral device. After progressing through the type, vendor, and model levels of the tree, the host controller may then set the parameters based on the type, vendor, and model selected. Once selected and/or set, the host controller may store the various parameters comprising device configuration information in a memory device, such as serial EPROM 31 of FIG. 3.

Similar to lookup table 120 of FIG. 6, tree structure 130 may be implemented in various ways. In one embodiment, a lookup table may be stored in read-only memory within a host controller. In another embodiment, tree structure 130 may be included with operating system software, and may reside in main memory or in storage (e.g. hard disk storage), and may be accessed as necessary by a host controller. Tree structures may further be configured to be updated by software, such as new revisions of an operating system, or with software included with a peripheral device. A wide variety of implementation methods are possible and contemplated for tree structure 130 and its various related embodiments.

Figure 8:
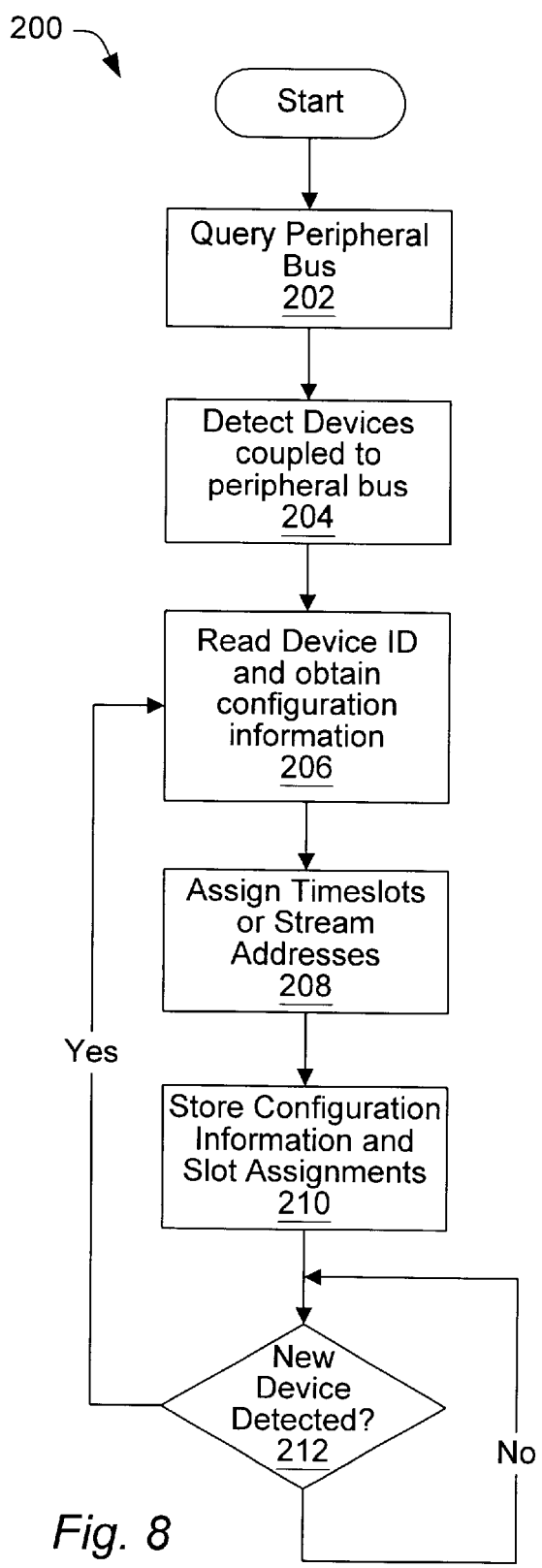
FIG. 8 is a flow diagram of one embodiment of a method for reading device information and configuring the peripheral bus and the devices coupled to it.

Moving now to FIG. 8, a flow diagram of one embodiment of a method for reading device information and configuring the peripheral bus and the devices coupled to it is shown. Method 200 is one of many possible methods for reading device information and configuring a peripheral bus to function with each of the devices.

Method 200 begins at Step 202 with the querying of the peripheral bus by a host controller. In one embodiment, a host controller may read check every possible address on the bus to determine the presence of peripheral devices. In Step 204, the host controller may detect devices coupled to the peripheral bus. Following the detection of devices coupled to the peripheral bus, the host controller may write information to a serial EPROM indicating that is has detected a device for each address as which a device resides.

In Step 206, the host controller may begin reading device identification information and obtaining configuration information. In one embodiment, the host controller may read all device identification information and configuration information from the device itself. This may be performed by a single read, such as a single serial read on a serial bus, or by successive reads. As the information is read and transferred from the peripheral device to the host controller, it may also be stored in a serial EPROM or other memory device for future reference. In another embodiment, the host controller may read identification information from each peripheral device and obtain configuration information from a data structure such as the lookup table of FIG. 6 or the tree structure of FIG. 7.

After reading device identification information and obtaining configuration information, the host controller may then begin configuring the peripheral bus. This may include the assignment of timeslots or stream addresses (Step 208). The assignment of timeslots or stream addresses for each peripheral device may be base upon many different factors, such as bandwidth requirements, data formats, and so forth. Configuring the peripheral bus may also include preparing each device, as well as the host controller, for certain modes of operation. For example, the host controller may determine whether a particular peripheral device is to operate in a single-pin mode or a dual-pin mode on a DSL bus, or may determine an audio mode for a device operating under the AC '97 specification.

In Step 210, configuration information and timeslot assignments (or stream assignments) may be written to a memory device, such as a serial EPROM. The configuration information may be stored in the device for future reference by both the host controller and the peripheral device. It should be noted that, in some embodiments, some configuration information may be written to the serial EPROM or other storage memory mechanism prior to assigning timeslots or data streams.

After all configuration information and slot/stream assignments have been made, the peripheral bus may be ready for operation. If operating conditions change, the peripheral bus may reconfigure the bus as necessary in order to ensure optimal operating conditions. Furthermore, as in Step 212, the host controller may monitor the peripheral bus for newly-added devices, such as plug and play devices. If a new device is detected by the peripheral bus, the method may return to Step 206 and read the device ID information for the new device. The host controller may also read or obtain configuration information for the added device. After reading the device identification information for the added device, as well as obtaining any additional configuration information necessary, the host controller may again perform the bus configuration operations of Steps 208 and 210. This may include the re-assignment of timeslots or streams for devices already present on the bus in order to accommodate the new device. Following the configuring of the device and the assignment of timeslots or streams, the information may be written to the serial EPROM or other memory device, and bus operations may resume.

In addition to the detection of newly-added devices, some embodiments of the method may also include the host controller monitoring the bus for the removal of a device from the bus. If a device is removed from the bus, the host controller may again re-assign timeslots or data streams and perform other configuration functions. This may be useful in optimizing the bandwidth use of the bus, as timeslots or data streams previously assigned to the since-removed device can be utilized for a device that is still remaining on the bus.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A computer system comprising:
   a host controller;
   a peripheral device coupled to the host controller by a peripheral bus;
   wherein the host controller is configured to:
      read configuration information from the peripheral device coupled to a peripheral bus, wherein a plurality of peripheral devices are coupled to the peripheral bus, and wherein reading the configuration information includes reading device identification information;
      configure the peripheral bus for communications between the host controller and the peripheral device, wherein configuring the peripheral device includes the host controller performing a self-configuration; and
      configure the device based on said configuration information, wherein configuring the device includes programming the device to use a first set of timeslots, and further includes programming each of the plurality of peripheral devices to use a plurality of sets of timeslots, wherein each of the plurality of sets of timeslots corresponds with one of the plurality of peripheral devices.

2. The computer system as recited in claim 1, wherein the peripheral bus is a serial bus.

3. The computer system as recited in claim 1, wherein the configuration information further includes one or more of the following:
   quantity of timeslots needed by the peripheral device;
   position of timeslots needed by the peripheral device;
   data width of the peripheral device;
   supported peripheral modes;
   amount of buffer memory available in the peripheral device;
   data format required by the peripheral device;
   amount of I/O space required on higher layer system buses; and
   clocking information.

4. The computer system as recited in claim 3, wherein the configuration information is passed from the peripheral device to the host controller by a single serial read.

5. The computer system as recited in claim 3, wherein the host controller is configured to read device identification information from the peripheral device, and obtain the configuration information from a lookup table.

6. The computer system as recited in claim 3, wherein said reading is performed over a side serial bus, wherein the side serial bus is coupled to the host controller and the peripheral device.

7. The computer system as recited in claim 3, wherein the clocking information includes a determination of whether a peripheral device clock is a master clock or a slave clock.

8. The computer system as recited in claim 1 further comprising a serial erasable programmable read-only memory (EPROM) configured to store the configuration information from the peripheral device.

9. The computer system as recited in claim 1, wherein the host controller is configured to address the peripheral device using stream addressing.

10. The computer system as recited in claim 1, wherein the host controller is further configured to:
    query the peripheral bus for each of the plurality of peripheral devices, wherein querying includes reading each possible address on the peripheral bus;
    determine the presence of each of the plurality of peripheral devices at an address on the peripheral bus;
    read configuration information from each of the plurality of peripheral devices; and
    program each of the plurality of peripheral devices to use a set of predetermined timeslots.

11. The computer system as recited in claim 1, wherein the identification information includes vendor identification and function of the peripheral device.

12. The computer system as recited in claim 1, wherein the peripheral device is plug and play compatible.

13. A method for configuring peripheral devices coupled to a peripheral bus, the method comprising:
   reading configuration information from a peripheral device coupled to a host controller, wherein a plurality of peripheral devices and the host controller are coupled to the peripheral bus, and wherein the configuration information includes device identification information;
   configuring the host controller to communicate with the peripheral device via the peripheral bus; and
   configuring the peripheral device based on said configuration information, wherein said configuring the device includes programming the device to use a first set of timeslots.

14. The method as recited in claim 13, wherein the peripheral bus is a serial bus.

15. The method as recited in claim 13, wherein the configuration information further includes one or more of the following:
   quantity of timeslots needed by the peripheral device;
   position of timeslots needed by the peripheral device;
   data width of the peripheral device;
   supported peripheral modes;
   amount of buffer memory available in the peripheral device;
   data format required by the peripheral device;
   amount of I/O space required on higher layer system buses; and
   clocking information.

16. The method as recited in claim 15, wherein the configuration information is passed from the peripheral device to the host controller by a single serial read.

17. The method as recited in claim 15 further comprising the host controller reading device identification information from the peripheral device, and obtaining additional configuration information from a lookup table.

18. The method as recited in claim 15, wherein said reading is performed over a side serial bus, wherein the side serial bus is coupled to the host controller and the peripheral device.

19. The method as recited in claim 15, wherein the clocking information includes a determination of whether a peripheral device clock is a master clock or a slave clock.

20. The method as recited in claim 13 further comprising storing the configuration information from the peripheral device in a serial erasable programmable read-only memory (EPROM).

21. The method as recited in claim 13 further comprising the host controller addressing the peripheral device using stream addressing.

22. The method as recited in claim 13, further comprising:
   querying the peripheral bus for each of the plurality of peripheral devices, wherein said querying includes reading each possible address on the peripheral bus;
   determining the presence of each of the plurality of peripheral devices at an address on the peripheral bus;
   reading configuration information from each of the plurality of peripheral devices; and
   programming each of the plurality of peripheral devices to use a set of timeslots.

23. The method as recited in claim 22, wherein said querying, said determining, said reading, and said configuring are performed by a host controller coupled to the peripheral bus.

24. The method as recited in claim 13, wherein the identification information includes vendor identification and function of the peripheral device.

25. The method as recited in claim 13, wherein the peripheral device is plug and play compatible.

* * * * *